(12) United States Patent
Karasik et al.

(10) Patent No.: US 6,534,732 B2
(45) Date of Patent: Mar. 18, 2003

(54) MULTIFUNCTIONAL WINDSHIELD WIPER STALK SWITCH

(75) Inventors: Vladimir Karasik, Walled Lake, MI (US); Joseph E. Khoury, Stromberg (DE); Michael Shahan, Allen Park, MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/838,465

(22) Filed: Apr. 19, 2001

(65) Prior Publication Data

US 2002/0153233 A1 Oct. 24, 2002

(51) Int. Cl.[7] .................................................. H01H 9/00
(52) U.S. Cl. .................................................. 200/61.54
(58) Field of Search .................. 200/61.27–61.38, 200/17 R, 18, 332, 335, 61.54

(56) References Cited

U.S. PATENT DOCUMENTS 3,745,288 A * 7/1973 Reimer ..................... 200/16 A
5,610,378 A * 3/1997 DuRocher et al. ........ 200/61.27
6,172,312 B1 * 1/2001 Maranzano ............... 200/61.28

* cited by examiner

Primary Examiner—Elvin Enad
Assistant Examiner—M. Fishman
(74) Attorney, Agent, or Firm—Blank Rome LLP

(57) ABSTRACT

A combined windshield front and rear washing and wiping stalk switch having a single contact substrate that is adapted to engage a front wiper carrier, a front wash carrier and a rear wipe/wash carrier. To this end, the multifunctional steering column stalk switch comprises: (i) a housing; (ii) a substrate fixed inside the housing having a first leg and a second leg defining a predetermined angle between the first leg and the second leg; (iii) a conductive trace on one surface of each leg; (iv) a first carrier moveably engaged with the first leg having an electrical contact adapted to engage the conductive trace on the first leg; (v) a second carrier moveably engaged with the second leg having an electrical contact adapted to engage the conductive trace on the second leg; (vi) a first manual input device adapted to move the first carrier with respect to the first leg; and (vii) a second manual input device adapted to move the second carrier with respect to the second leg.

23 Claims, 2 Drawing Sheets

MULTIFUNCTIONAL WINDSHIELD WIPER STALK SWITCH

BACKGROUND OF THE INVENTION

1. Field of the Invention

The present invention relates generally to multifunctional steering column stalk switches for automobiles. More specifically, the present invention relates to an improved combined windshield front and rear washing and wiping stalk switch.

2. Discussion of the Background

The use of steering column stalk switches for various driver operated functions of an automobile is well known. Steering column stalk switches exist for operating an automobile's cruise control system, its turn signal and lighting systems and its windshield wiping systems. Extending from either side of the steering column, the stalk switches are readily accessible by the driver. The stalk switches generally require the driver to push or translate a portion of the switch to make a contact and initiate one of the automobile's functions. Or, the stalk switches require the driver to rotate a portion to make a contact and initiate one of the automobile's functions. In many instances, the rotational movement sets a variation in a particular function, such as a particular light intensity setting from a plurality of possible intensities for the light or a particular wiper speed setting from a plurality of possible wiper speeds.

Both a translational or a rotational movement of a portion of the stalk switch can make one of two types of electrical contact, i.e., a momentary or a latching (maintained) contact. With either a translational or a rotational momentary contact, when the driver releases the switch, the switch returns to a normal and most likely an unenergized or off state. Usually an attached biasing mechanism or spring, which is compressed or stretched when the driver translates or rotates the associated switch portion, uncoils or returns to its unenergized state and thereby returns the translated or rotated switch portion to its unenergized position. Momentary translational contacts commonly control the front windshield wash function. That is, when the driver pushes or translates a button or knob, the movement causes the windshield wash to begin, and when the driver releases the knob, the wash stops.

With either a translational or a rotational latching contact, when the driver releases the switch, the switch remains latched in an energized or on state until the driver selects another latched position or until the driver otherwise breaks the conductive path made by the switch, i.e., opens a separate switch. As stated above, the latching switches often control different states or degrees of a single automobile function. When this is the case, the driver needs to know when a particular state has been achieved, which usually requires that the switch contain a plurality of detents. The detents provide tactile feedback to the driver, i.e., a popping or snapping feel, when the switch has latched into a particular position. Manufacturers use detents in both translational and rotational latching switches.

There are many known switches having translating and/or rotating latching contacts. Some known systems employ two PCB's and rotatable contacts. Other systems employ two PCB's that are perpendicularly disposed to each other and have a combination of rotatable and slideable contacts. In many instances, the multiple boards require separate grounding wires and jumper wires between the boards. The multiple boards and their added materials increase the cost of the components and the assembly necessary for the switch. Additional soldering joints and/or wire plug connections also increase the chance of failure and decreases the robustness of the switch. Accordingly, a need exists for a simpler steering column stalk switch that: (i) enables a plurality of translational, rotatable, momentary and latching electrical connections; (ii) improves electrical contact reliability; (iii) increases the overall robustness of operation; (iv) decreases wires, parts and assembly; and (v) improves wire packaging and wire routing.

SUMMARY OF THE INVENTION

The present invention provides an improved multifunctional steering wheel stalk switch for an automobile. More specifically, the present invention provides an improved combined windshield front and rear washing and wiping stalk switch having a single contact substrate that is adapted to engage a front wiper carrier, a front wash carrier and a rear wipe/wash carrier.

To this end, in an embodiment of the present invention, a multifunctional steering column stalk switch comprises: (i) a housing; (ii) a substrate fixed inside the housing having a first leg and a second leg defining a predetermined angle between the first leg and the second leg; (iii) a conductive trace on one surface of each leg; (iv) a first carrier moveably engaged with the first leg having an electrical contact adapted to engage the conductive trace on the first leg; (v) a second carrier moveably engaged with the second leg having an electrical contact adapted to engage the conductive trace on the second leg; (vi) a first manual input device adapted to move the first carrier with respect to the first leg; and (vii) a second manual input device adapted to move the second carrier with respect to the second leg.

In an alternative of this embodiment, the first carrier slidingly engages the first leg. In another, the first manual input device is adapted to be manually translated. A further alternative of this embodiment includes a spring disposed between the first leg and the first carrier.

In an alternative of this embodiment, the second carrier rotatably engages the second leg. In another, the second manual input device is adapted to be manually rotated. In a further, the second manual input device includes a plurality of detents for providing a tactile sensation to the driver.

An alternative of this embodiment includes an additional conductive trace on another surface of a leg of the substrate. Another alternative of this embodiment includes a third carrier moveably engaged with the other surface, the third carrier having an electrical contact adapted to engage the conductive trace on the other surface. A further alternative of this embodiment includes a spring disposed between the other surface and the third carrier.

In an alternative of this embodiment, the third carrier slidingly engages the other surface. Another alternative of this embodiment includes a third manual input device adapted to move the third carrier with respect to other surface.

In an alternative of this embodiment, the third manual input device is adapted to be manually rotated. In another, the third manual input device includes a plurality of detents for providing a tactile sensation to the driver. In a further, the third manual input device includes a ramp for converting manual rotation of the ramp to linear translation by the third carrier.

In another embodiment of the present invention, a contact substrate that moveably engages a plurality of carriers, each carrier having an electrical contact, comprises: (i) a first leg and a second leg defining a predetermined angle between the first leg and the second leg; (ii) a conductive trace on each of two surfaces of the first leg, wherein the conductive trace of each surface is adapted to engage the electrical contact of a carrier; and (iii) a conductive trace on a surface of the second leg, wherein the conductive trace is adapted to engage the electrical contact of a carrier.

In an embodiment of the present invention, a conductive trace on one surface of the first leg is adapted to linearly engage a moving contact of the carrier. In another, a conductive trace on each surface of the first leg is adapted to linearly engage a moving contact of a carrier. In a further, a conductive trace on one surface of the second leg is adapted to engage a moving contact of a carrier.

In a further embodiment of the present invention, a multifunctional windshield wiper stalk switch comprises: (i) a housing; (ii) a substrate fixed inside the housing having a first leg and a second leg defining a predetermined angle between the first leg and the second leg; (iii) a first carrier moveably engaged with a leg having an electrical contact adapted to enable a windshield wiper circuit to be energized; (iv) a second carrier moveably engaged with a leg having an electrical contact adapted to enable a windshield wiper circuit to be energized; and (v) a third carrier moveably engaged with a leg having an electrical contact adapted to enable a windshield wiper circuit to be energized.

In an alternative of this embodiment, the electrical contact of the first carrier is adapted to enable a front windshield wash circuit to be energized. In another, the electrical contact of the second carrier is adapted to enable a rear windshield wipe circuit to be energized. In a further, the electrical contact of the third carrier is adapted to enable a front windshield wipe circuit to be energized.

An advantage of the present invention is to provide an improved multifunctional steering column stalk switch, which simplifies assembly and enhances robustness.

Another advantage of the present invention is to provide an improved contact substrate for a multifunctional steering column stalk switch, which lessens the required number of ground and jumper wires.

A further advantage of the present invention is to provide an improved multifunctional windshield wiper stalk switch, which controls the front and rear wash and wipe functions.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 3 is a fragmentary schematic perspective view of the rear ring illustrating a plurality of detents in combination with a rear detent plunger and the serpentine rotation to translation ramp and engaged with a cam of the rear wiper carrier.

DETAILED DESCRIPTION OF THE PRESENTLY PREFERRED EMBODIMENTS

Figure 1:
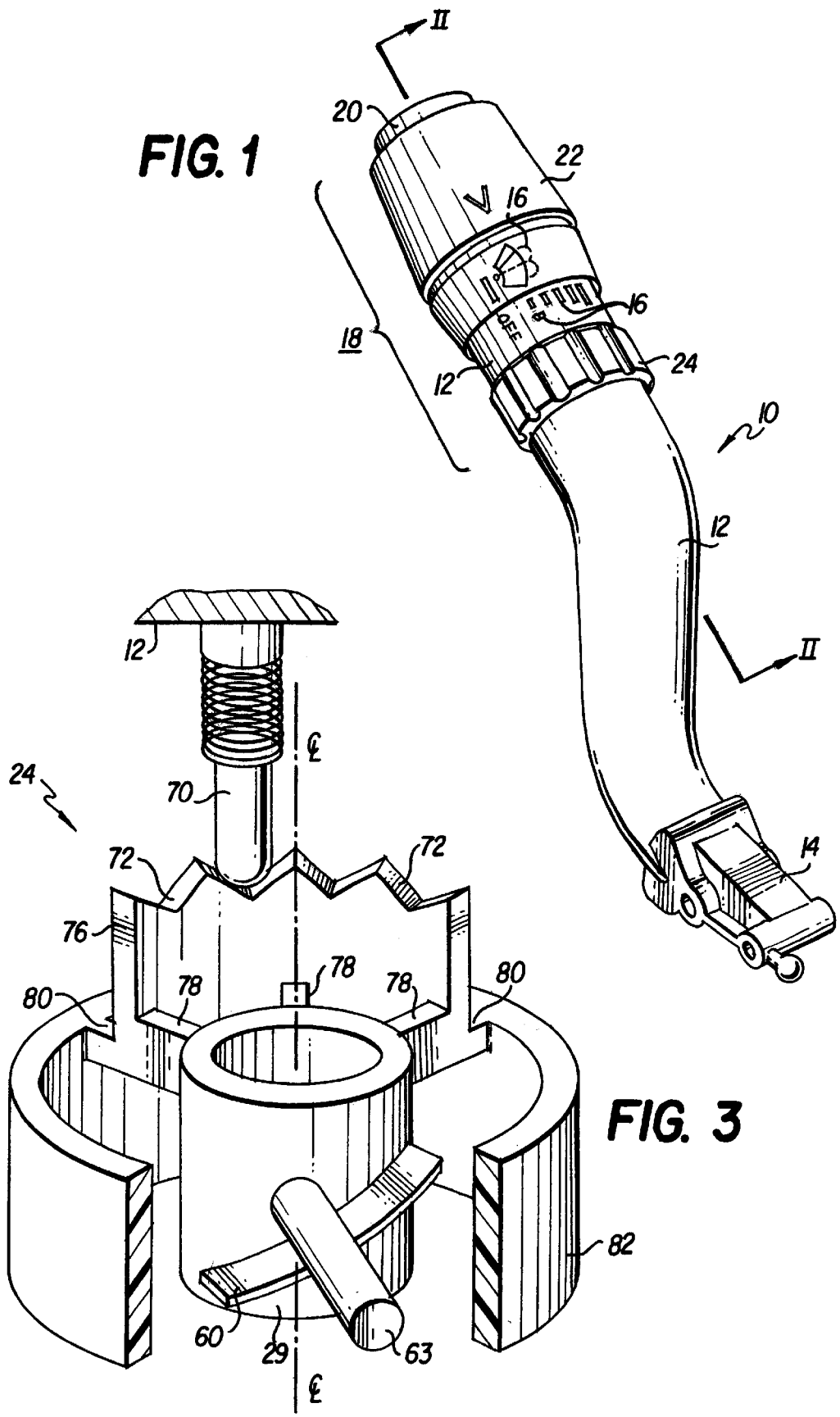
FIG. 1 is a perspective view of the outside of the improved multifunctional steering column stalk switch of the present invention.

Referring now to FIG. 1, a perspective view of the improved multifunctional steering column stalk switch of the present invention illustrates that the switch 10 has a stalk 12, which in one preferred embodiment is circular in cross section, and an attachment apparatus 14 at one end of the stalk 12. The attachment apparatus 14 enables the switch 10 to mount to a steering column (not illustrated). The attachment apparatus 14 is well known and preferably adaptable to be fixedly or pivotally mounted to the steering column. The stalk 12 is also well known and is preferably of a strong, light weight material such as plastic. The stalk 12 includes being straight or curved so that an automobile driver can more readily see indicia 16 displayed by the switch.

The end of the stalk 12 opposed to the attachment apparatus 14 includes a housing 18 that contains manually operated input devices on its exterior and the major switching components in its interior. The multifunctional stalk switch is adaptable to control many automobile functions, such as turn signal and lighting functions, wherein the switch 10 includes manually operated input devices and switch outputs adapted for these functions. One preferred embodiment of the multifunctional stalk switch controls windshield wiping and washing for the front and rear windshields for an automobile. To this end, the housing 18 includes a preferably momentary pushbutton 20, a front knob 22 and a rear ring 24. The housing also includes a section of stalk 12 in between the front knob 22 and the rear ring 24.

The pushbutton 20 is moveably disposed inside the front knob 22 at the end of the housing 18. The well known pushbutton 20 enables the driver to press and translate the button 20 inward and axially along the centerline of the generally cylindrical housing 18. The pushbutton 20 is preferably momentary and thereby includes a spring or biasing device (illustrated below) that returns the pushbutton 20 outwardly to a normal, unenergized position when the driver releases the button. When the driver presses and translates the pushbutton 20 a predetermined distance, the button causes an electrical connection, described in detail below, which initiates the front windshield wash. As long as the driver maintains the pushbutton 20 at the predetermined distance, the front windshield wash continues. When the driver discontinues pressing the pushbutton 20, the spring or biasing device causes the pushbutton to move axially outwardly and a second spring or biasing device (illustrated below) causes the electrical connection to open and the front windshield wash to stop.

The front knob 22 rotatably attaches to the housing 18 and covers a portion of the pushbutton as illustrated. The driver is preferably enabled to engage or grab and rotate or twist the front knob clockwise or counterclockwise. The housing 18 includes employing stops (not illustrated) that disallow rotation of the front knob 22, in one or both directions, past a predetermined point. Alternatively, the knob 22 is enabled to rotate limitlessly in one direction and is disallowed to rotate in the other direction.

The front knob 22 preferably makes a plurality of latching or maintained electrical connections. When the driver turns or rotates the front knob 22, clockwise or counterclockwise, to a first predetermined point, the knob 22 causes a first electrical connection, described in detail below, which initiates a first front windshield wiper speed. The switch 10 maintains this contact even when the driver releases the front knob 22. When the driver turns or rotates the front knob 22 to a second predetermined point, the knob 22 opens the first electrical connection and causes a second electrical connection, etc. The maintained electrical connections of the front knob 22 initiate a wiper off, a fast wipe, a slow wipe and a plurality of variable speed wipes.

The rear ring 24 rotatably attaches to the housing 18 at the end closest to the attachment apparatus 14 fixed to the stalk 12. The driver is preferably enabled to engage or grab and rotate or twist the rear ring 24 clockwise or counterclockwise. The housing 18 includes employing stops (not illustrated) that disallow rotation of the rear ring 24, in one or both directions, past a predetermined point.

The ring 24 preferably makes a plurality of latching or continuous electrical connections. When the driver turns or rotates the rear ring 24, clockwise or counterclockwise, to a first predetermined point, the ring 24 causes a first electrical connection, described in detail below, which initiates a first front windshield wiper speed. The switch 10 maintains this contact even when the driver releases the front ring 24. When the driver turns or rotates the rear ring 24 to a second predetermined point, the ring 22 opens the first electrical connection and causes a second electrical connection, etc. The maintained electrical connections of the rear ring 24 initiate a plurality of different rear wiper speeds. Additionally, one of the settings preferably initiates the rear wash. Alternatively, a rear ring electrical connection initiates one of a plurality of different rear wiper speeds and the rear wash.

Figure 2:
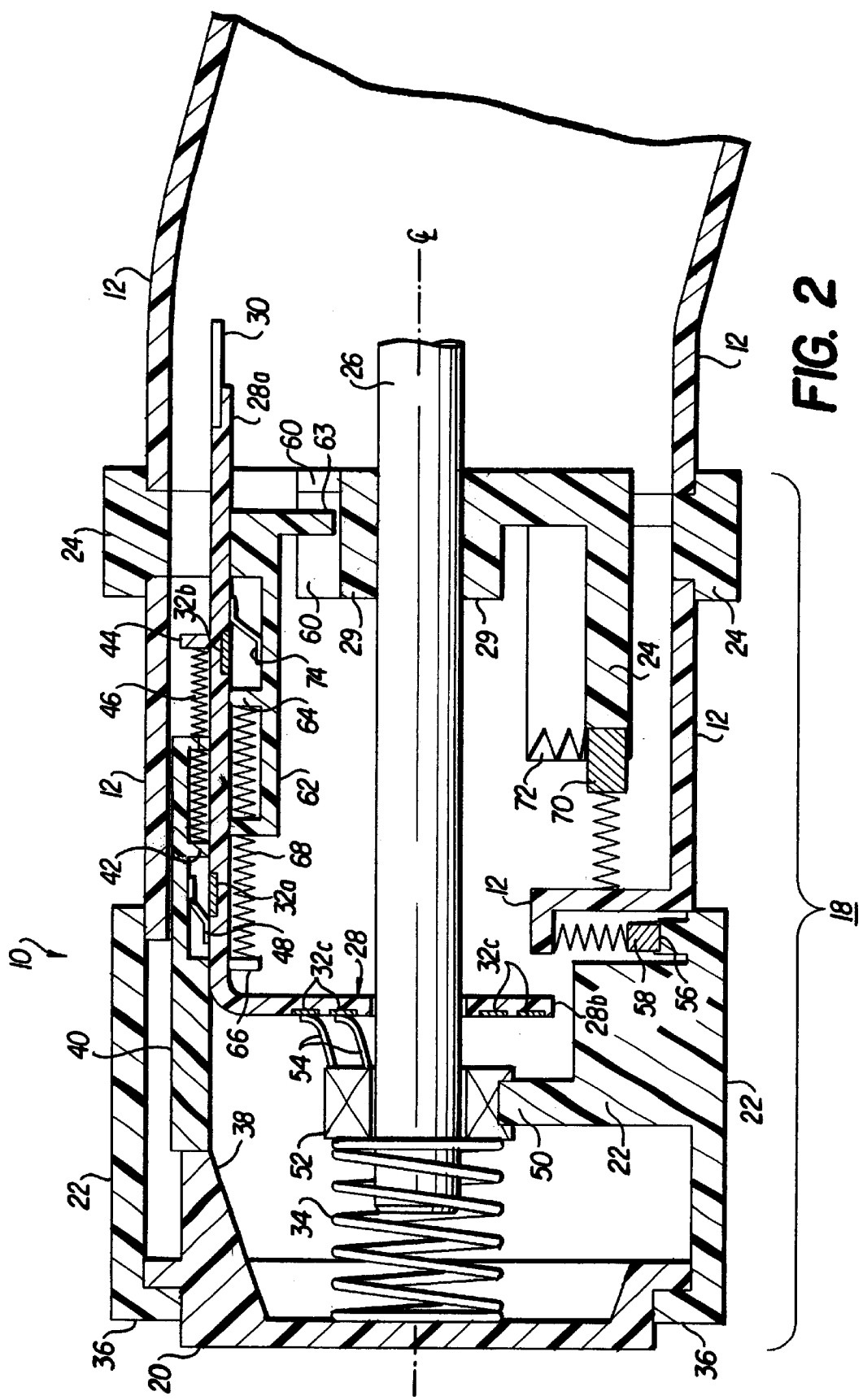
FIG. 2 is a schematic elevation sectional view taken through the centerline II—II of FIG. 1 illustrating three different electrical contacts caused by three different manual input devices.

Referring now to FIG. 2, a front elevation sectional view of the switch 10 illustrated in FIG. 1 schematically illustrates how manual operation of the pushbutton 20, the front knob 22 and the rear ring 24 produces the desired electrical connections. The housing 18 includes the pushbutton 20, the front knob 22 and the rear ring 24 and a section of the stalk 12 disposed between the front knob 22 and the rear ring 24. Another section of the stalk 12 abuts the opposite end of the rear ring 24 and extends (optionally in a curved manner) towards the attachment apparatus discussed in FIG. 1. It should be appreciated from FIG. 2 that the front knob 22 rotates clockwise or counterclockwise about the pushbutton 20 and a stationary section of the stalk 12. The rear ring 24 rotates about stationary sections of the stalk 12.

A number of other stationary components exist within the housing 18. A shaft 26 runs through the center of the housing 18 as is fixed axially with respect to the remainder of the switch 10 via a suitable pinning device or a bulkhead (not illustrated). A collar 28 integral to the rear ring 24 defines a hole that receives the shaft 26, so that the collar 28 and the rear ring 24 rotate about the shaft 26. An "L" shaped substrate 28 is also preferably constrained from moving relative to the remainder of the switch 10 via a suitable attachment device (not illustrated). The vertically disposed leg of the substrate 28 defines a hole that receives the shaft 26.

The substrate 28 is a well known PCB of conventional construction, formed of suitable electrically insulating material. A plurality of electrically conductive copper traces are formed in various places on the substrate 28, as discussed below. The traces are preferably individually connected to copper conductors 30 at the end of the horizontal leg of the substrate 28. The conductors 30 are in turn connected to various circuits of the windshield wiper controller or other multifunctional controller. The substrate 28 is preferably molded flat and then bent preferably ninety degrees. The present invention contemplates suitably modifying the substrate 28 along its bend line to only include bendable metal or bendable material in the stressed area around the bend. Otherwise the insulative material includes being constructed such that it can withstand the stresses of the bend.

The substrate 28 includes one or preferably a plurality of traces 32a on the top surface of the horizontal leg of the substrate 28. The substrate 28 includes one or preferably a plurality of traces 32b on the bottom surface of the horizontal leg of the substrate 28. Although only a portion of the horizontally disposed traces are shown for the sake of clarity, the traces 32a and 32b preferably run the entire distance of the horizontal leg of the substrate 28 and connect to one of the connectors 30. Further, although FIG. 2 illustrates one section of a top surface trace 32a a bottom surface trace 32b, the substrate 28 includes different traces at different depths, i.e., at different sections taken through the substrate 28. The particular arrangement of the traces 32a and 32b and their respective paths to the connectors 30 are generally a matter of design and will change from application to application.

The substrate 28 includes one or preferably a plurality of traces 32c on the outside surface of the "L" of the vertical leg of the substrate 28. The traces preferably run concentrically about the centerline of the shaft 26, so that the traces appear above and below the shaft 26 in cross-section. The section of the vertical leg of the substrate 28 illustrates a plurality of different radially disposed traces 32c. The radially disposed traces 32c of the vertical leg of the substrate 28 preferably connect to traces that run vertically upward for the remainder of the vertical leg, then run horizontally along the entire length of the horizontal leg of the substrate 28 and eventually connect to a connector 30 at the end of the substrate 28. Although not illustrated, to maximize space, the substrate includes connecting one or more radially disposed traces 32c to a trace that passes through the vertical leg of the substrate 28 and runs vertically up the inner surface of the vertical leg. The traces 32a, 32b, 32c can be made using metal plating on plastic technology that allows for three dimensional metal trace structures.

The "L" shaped substrate enables much of the "wiring" of the switch 10 to be accomplished by maximizing the available copper trace space on both sides of the insulative substrate 28. The single piece substrate 28 eliminates wires that would otherwise exist if the vertical and horizontal legs of the substrate 28 were separate PCB's. Also, since there is only one PCB, there need be only one ground connection. Further, each of the traces terminates at the connectors 30, which are at the end of the substrate 28 closest to the stalk 12 leading to the attachment apparatus 14 (FIG. 1). The "L" shaped substrate 28 therefore eliminates having to fold or run wires between the rotating and translating components of the housing 18.

As disclosed above, the present invention includes three manually operated input devices; namely, the pushbutton 20, the front knob 22 and the rear ring 24, which enable or initiate three separate automobile functions, and in one embodiment three separate windshield wiper functions. The pushbutton 20 slidingly engages the inner surface of the front knob 22. When the driver presses the pushbutton 20, the button 20 translates inward and compresses a button spring 34 against a suitable fixed object, illustrated schematically as the front wipe carrier but alternatively including an extension of: the stalk 12, the shaft 26 or the front knob 22 (not illustrated). When the driver releases the pushbutton 20, the button spring 34 decompresses and pushes the pushbutton 20 outward until the pushbutton hits a suitable button catch 36, illustrated schematically as inward projections of the front knob 22 but alternatively including an outward projection from the shaft 26 through a hole the pushbutton 20 (not illustrated).

A cantilever 38 integral to and extending axially inward from the driver interface surface of the pushbutton 20 is preferably in constant contact with a front wash carrier 40.

The front wash carrier 40 preferably slidingly engages the top surface of the horizontal leg of the substrate 28, so that the front wash carrier is constrained to only move axially, i.e., parallel to the centerline of the housing 18. For purposes of the present schematic illustration, the apparatus and method for constraining lateral movement of the front wash carrier 40 with respect to the substrate 28 is not illustrated. It should be appreciated that those skilled in the art are equipped to slidingly attach a carrier to a substrate.

The front wash carrier 40 includes a first wash spring catch 42, and the substrate 28 includes a second wash spring catch 44 on its upper surface. A wash spring 46 is disposed or assembled between the wash spring catches 42 and 44. When the driver translates the pushbutton 20, the integral cantilever 38 moves or translates the front wash carrier 40 inwardly along the top surface of the substrate 28. The wash spring catch 42 integral to or attached to the wash carrier 40 moves with the carrier 40 and compresses the wash spring 46 against the stationary wash spring catch 44 of the stationary substrate 28. When the driver releases the pushbutton 20, the cantilever 38 biased to move outwardly, moves away from the substrate 28 and attempts to move away from the front wash carrier 40. The compressed wash spring 46, however, decompresses and translates the front wash carrier 40 outwardly along the top surface of the substrate 28 so that it continuously abuts the cantilever 38.

During the sequence previously described, when the driver translates the pushbutton 20 a predetermined distance, one or a plurality of copper or otherwise electrically conductive contacts 48, connected to the front wash carrier 40, engages preferably a plurality of topside traces 32a and closes the front wash circuit, which initiates the front wash. In one preferred embodiment, the contacts 48 are U-shaped and include a pair of copper leads that are adapted to contact two of the traces 32a. As long as the driver maintains the pushbutton 20 in a translated state, the cantilever 38 maintains the front wash carrier such that its one or more contacts 48 engage one or more traces 32a and such that the front wash remains on. As soon as the driver releases the pushbutton 20 and the electrical connection is broken, the front wash stops.

When the driver rotates the front knob 22 clockwise or counterclockwise as described above, a projection 50 extending radially inward from the front knob 22 catches or contacts a front wipe carrier 52 and thereby rotates the front wipe carrier 52. For purposes of schematic illustration, the projection 50 is simply shown as vertically engaging the front wipe carrier 52, which extends downwardly from the shaft 26. It should be appreciated that the present invention includes interlocking one or more projections, such as the projection 50, from the front knob 22 with the front wipe carrier 52, so as to rotate the carrier 52 in the direction that the driver rotates the front knob 22.

The front wipe carrier 52 includes one or more copper or otherwise electrically conductive contacts 54 that extend from the carrier 52 onto the outer surface of the vertical leg of the substrate 28. In one preferred embodiment, the contacts 54 are U-shaped and include a pair of copper leads that are adapted to contact two of the traces 32c, formed in the contacting vertical surface of the substrate 28, to close a rear wiper circuit. When the front wipe carrier 52 rotates, the contacts 54 also rotate along an arc created by the radius from the center of the shaft 26 to the point at which a contact 54 communicates with the vertical leg of the substrate 28. The radii of the contacts 54 preferably correspond to or match up with the radii of the traces 32c imbedded in the vertical leg of the substrate 28.

When the driver rotates the front wipe carrier 52 to a first predetermined angle on the substrate having a first trace 32c, a first electrical connection is made that closes a first front windshield wipe circuit, which preferably sets the speed of (or turns off) the front windshield wiper motor to a first setting. Likewise when the driver rotates the front wipe carrier 52 to a second predetermined angle on the substrate having a second trace 32c, the first electrical connection is opened and a second electrical connection is made that closes a second front windshield wipe circuit, which preferably sets another speed of (or turns off the front windshield wiper motor. The various speeds of the front windshield wiper are discussed above and preferably include an off speed or position.

The electrical connections caused by various angles on the substrate 28 that include traces 32c adapted to connect with a set of contacts 54 of the rotating carrier 52 are indicated or communicated to the driver via detents 56 extending radially inward from the inner wall of the front knob 22. As illustrated by a second similar set of axially disposed detents 72, discussed below, the detents 56 generally comprise a series of triangular shaped peaks and valleys. A spring loaded detent plunger 58 is suitably attached to the stalk 12 or other stationary device, e.g., the shaft 26, such that the spring of the plunger 58 constantly compresses the plunger 58 onto the detent profile, and so that the plunger 58 rides along the peaks and valleys of the detents 56. When the driver rotates the front knob 22 clockwise or counterclockwise to a point such that the spring loaded detent plunger 58 compresses itself into a valley of a detent 56, i.e., temporarily locks into the detent 56, the front knob 22 has preferably simultaneously rotated the front wipe carrier 52 to a point wherein one of its contacts 54 engages a trace 32c.

The tactile popping or snapping sensation of the spring loaded detent plunger 58 bottoming out in the valley of a detent 56 tells or communicates to the driver that a particular wiper speed is set, and the corresponding electrical connection between the contact 54 of the front wipe carrier 52 and the trace 32c of the vertical wall of the substrate 28 initiates the associated wiper motor speed. The indicia 16 of FIG. 1 preferably informs the driver as to which way to turn the front knob 22 to increase or decrease the front wiper speed. Although the spring rate and spring loading characteristics of the spring loaded plunger 58, the shape of the detents 56 and the shape of the detent plunger 58 preferably suitably lock the detent plunger 58 in position with respect to vibrations caused by driving and moving the steering wheel and steering column, the driver preferably easily overcomes the locking force by tuning the front knob 22.

When the driver rotates the rear ring 24 clockwise or counterclockwise as described above, a serpentine ramp 60 formed integrally with the collar 28 of the rear ring 24 and extending radially and axially at a predetermined angle to the centerline of the collar 28 converts the rotational motion of the rear ring 24 into translational motion by a rear wiper carrier 62. The ramp 60 engages a cam 63, which in one embodiment is a substantially cylindrical lever adapted to slide along the surface of the ramp 60. The conversion of the rotational motion of the collar 28 to the translational motion of the cam 63 of the carrier 62 is further illustrated below in FIG. 3. The rear wiper carrier 62 preferably slidingly engages the bottom surface of the horizontal leg of the substrate 28, so that the rear wiper carrier is constrained to only move axially, i.e., parallel to the centerline of the housing 18. For purposes of the present schematic illustration, the apparatus and method for constraining lateral movement of the rear wiper carrier 62 with respect to the substrate 28, which is preferably substantially the same as for the front wash carrier 40, is not illustrated.

The rear wiper carrier 62 includes a first rear spring catch 64, and the substrate 28 includes a second rear spring catch 66 on its lower surface. A rear spring 68 is disposed or assembled between the rear spring catches 64 and 66. When the driver rotates the rear ring 24 in one direction, the rotational to translational ramp 60 moves or translates the cam 63 of the rear wiper carrier 62 towards the vertical leg of the substrate 28 along the bottom surface of the substrate 28. The rear spring catch 64 integral to or attached to the rear carrier 62 moves with the carrier 62 and compresses the rear spring 68 against the stationary rear spring catch 66 of the stationary substrate 28. When the driver rotates the rear ring 24 in the other direction, the ramp 60 attempts to move away from the cam 63, however, the compressed rear spring 68 decompresses and constantly presses the cam 63 against the ramp 60. When the driver rotates the rear ring 24 in either rotational direction, to a predetermined position, a spring loaded detent plunger 70, suitably attached to the stalk 12 or other stationary device, e.g., the shaft 26, preferably constantly compresses the plunger 70 onto an axially disposed detent profile integral with the rear ring 24, so that the plunger rides along the peaks and valleys of the rear ring detents 72.

When the driver rotates the front knob 24 clockwise or counterclockwise to a point such that the spring loaded detent plunger 70 compresses itself into a valley of a detent 72, i.e., temporarily locks into the detent 72, the ramp 60 has preferably simultaneously translated the rear wiper carrier 62, via the cam 63, such that one or more contacts 74 have also translated and engaged one or more of the traces 32b. The rear wiper carrier 62 includes one or a plurality of copper or otherwise electrically conductive contacts 74 that extend from the carrier 62 onto the bottom surface of the horizontal leg of the substrate 28. In one preferred embodiment, the contacts 64 are U-shaped and include a pair of copper leads that are adapted to contact two of the traces 32b imbedded in the underside of the substrate 28, to close a rear wiper circuit.

The tactile popping or snapping sensation of the spring loaded detent plunger 70 bottoming out in the valley of a detent 72 tells or communicates to the driver that a particular rear wiper speed is set or that the rear wash is initiated, and the corresponding electrical connection between the contact 74 of the rear wiper carrier 62 and the trace 32b of the horizontal wall of the substrate 28 initiates the associated rear wiper function. The present invention includes the rear wash operating independent from the rear wipe, i.e., having its own detent 72 and circuit. The present invention also includes simultaneously initiating the rear wash with one or more or all of the rear wiper speed settings. The present invention includes one or more sets of the traces 32b for each different rear wiper speed, including an off position and alternatively a separate set of traces 32b for the rear windshield wash. In this manner, each detent 72 corresponds to a different circuit closure between the contact 74 and preferably a pair of traces 32b and thus corresponds to a different wiper speed setting, an off setting and alternatively a rear wash setting. For clarification purposes, only a portion of a single trace 32b is illustrated in FIG. 2.

It should be appreciated that when the driver releases the rear ring 24 after setting or bottoming out the spring loaded detent plunger 70 into the valley of one of the detents 72, the rear ring 24 and the rear wiper carrier 62 coupled thereto maintain the associated electrical connection between the contact 74 and one or more traces 32b until the driver further rotates the rear ring 24. Although the spring rate and spring loading characteristics of the spring loaded plunger 70, the shape of the detents 72 and the shape of the detent plunger 70 preferably suitably lock the detent plunger 70 in position with respect to vibrations caused by driving and moving the steering wheel and steering column, the driver preferably easily overcomes the locking force by turning the rear ring 24.

Referring now to FIG. 3, a schematic view of the rear ring 24 illustrates that the detents 72 and the associated detent profile preferably reside on a detent ring 76 that has one or more planar spokes 78, which connect the detent ring 76 to the collar 28 of the rear ring 24. The ramp 60, as stated above, connects to the collar 28. The detent ring 76 also includes one or more mounting protrusions 80 that connect the detent ring 76 to an outer wall 82 of the rear ring 24. In one preferred embodiment, the rear ring 24, including each of these components, is molded as a single plastic piece, as is well known in the art.

The spring loaded detent plunger 70 is schematically illustrated as being fixed to the stalk 12 and further illustrates that the detent plunger 70 is compressed onto and rides along the detent profile as the rear ring 24 rotates in either direction. The thickness of the detent ring 76 is suitably chosen with respect to the radius or width of the plunger 70 to adequately support the plunger 70 while rotating and when the plunger is temporarily locked into the valley of a detent 72.

The serpentine ramp 60 winds upward from the base of the collar 28 to a distance that is at least the axial distance necessary for the rear wash carrier 62 to translate the necessary distance along the substrate 28 to make the necessary electrical connections. The ramp 60 spirals about the collar 28, so that when the collar 28 rotates, the cam 63 of the carrier 62 remains at the same radial distance from the centerline of the collar 28 but moves axially upward or downward along in the direction parallel to the centerline. In one embodiment, the cam 63 includes being rollingly engaged with the remainder of the rear wiper carrier 62 to reduce the friction force between the ramp 60 and the cam 63 and thereby reduce the force necessary to turn the rear ring 24.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed is:

1. A multifunctional steering column stalk switch comprising:
    a housing;
    a substrate fixed inside the housing having a first leg and a second leg defining a predetermined angle between the first leg and the second leg;
    a conductive trace on one surface of each leg;
    a first carrier moveably engaged with the first leg having an electrical contact adapted to engage the conductive trace on the first leg;
    a second carrier moveably engaged with the second leg having an electrical contact adapted to engage the conductive trace on the second leg;
    a first manual input device adapted to move the first carrier with respect to the first leg; and
    a second manual input device adapted to move the second carrier with respect to the second leg.

2. The stalk switch of claim 1, wherein the first carrier slidingly engages the first leg.

3. The stalk switch of claim 1, which includes a spring disposed between the first leg and the first carrier.

4. The stalk switch of claim 1, wherein the first manual input device is adapted to be manually translated.

5. The stalk switch of claim 1, wherein the second carrier rotatably engages the second leg.

6. The stalk switch of claim 1, wherein the second manual input device is adapted to be manually rotated.

7. The stalk switch of claim 1, wherein the second manual input device includes a plurality of detents for providing a tactile sensation to the driver.

8. A multifunctional steering column stalk switch comprising:
- a housing;
- a substrate fixed inside the housing having a first leg and a second leg defining a predetermined angle between the first leg and the second leg;
- a conductive trace on one surface of each leg;
- a first carrier moveably engaged with the first leg having an electrical contact adapted to engage the conductive trace on the first leg;
- a second carrier moveably engaged with the second leg having an electrical contact adapted to engage the conductive trace on the second leg;
- a first manual input device adapted to move the first carrier with respect to the first leg; and
- a second manual input device adapted to move the second carrier with respect to the second leg; and
- an additional conductive trace on another surface of the first or second leg of the substrate.

9. The stalk switch of claim 8, which includes a third carrier moveably engaged with the other surface, the third carrier having an electrical contact adapted to engage the conductive trace on the other surface.

10. The stalk switch of claim 9, which includes a spring disposed between the other surface and the third carrier.

11. The stalk switch of claim 9, wherein the third carrier slidingly engages the other surface.

12. The stalk switch of claim 9, which includes a third manual input device adapted to move the third carrier with respect to other surface.

13. The stalk switch of claim 12, wherein the third manual input device is adapted to be manually rotated.

14. The stalk switch of claim 12, wherein the third manual input device includes a plurality of detents for providing a tactile sensation to the driver.

15. The stalk switch of claim 12, wherein the third manual input device includes a ramp for converting manual rotation of the ramp to linear translation by the third carrier.

16. A contact substrate that moveably engages a plurality of carriers, each carrier having an electrical contact, comprising:
- a first leg and a second leg defining a predetermined angle between the first leg and the second leg;
- a conductive trace on each of two surfaces of the first leg, wherein the conductive trace of each surface is adapted to engage the electrical contact of a carrier; and
- a conductive trace on a surface of the second leg, wherein the conductive trace is adapted to engage the electrical contact of a carrier.

17. The contact substrate of claim 16, wherein a conductive trace on one surface of the first leg is adapted to linearly engage a moving contact of the carrier.

18. The contact substrate of claim 16, wherein a conductive trace on each surface of the first leg is adapted to linearly engage a moving contact of a carrier.

19. The contact substrate of claim 16, wherein a conductive trace on one surface of the second leg is adapted to engage a moving contact of a carrier.

20. A multifunctional windshield wiper stalk switch comprising:
- a housing;
- a substrate fixed inside the housing having a first leg and a second leg defining a predetermined angle between the first leg and the second leg;
- a first carrier moveably engaged with a leg having an electrical contact adapted to enable a windshield wiper circuit to be energized;
- a second carrier moveably engaged with a leg having an electrical contact adapted to enable a windshield wiper circuit to be energized; and
- a third carrier moveably engaged with a leg having an electrical contact adapted to enable a windshield wiper circuit to be energized.

21. The windshield wiper stalk switch of claim 20, wherein the electrical contact of the first carrier is adapted to enable a front windshield wash circuit to be energized.

22. The windshield wiper stalk switch of claim 20, wherein the electrical contact of the second carrier is adapted to enable a rear windshield wipe circuit to be energized.

23. The windshield wiper stalk switch of claim 20, wherein the electrical contact of the third carrier is adapted to enable a front windshield wipe circuit to be energized.

* * * * *